United States Patent
Cox et al.

(10) Patent No.: US 7,862,739 B2
(45) Date of Patent: Jan. 4, 2011

(54) REFRIGERANT

(76) Inventors: Nicholas Cox, Earthcare Products Limited, 405 Mill Studio, Crane Mead, Ware (GB) SG12 9PY; Victor Mazur, Dept. of Thermodynamics, Academy of Refrigeration, 1/3 Dvoryanskaya Street, Odessa (UA) 65082; Daniel Colbourne, Earthcare Products Limited, 405 Mill Studio, Crane Mead, Ware (GB) SG12 9PY; Andrew Stevenson, E-Synergy Limited, 6-7 New Bridge Street, London (GB) EC4V 6AB (*) Notice: Subject to any disclaimer, the term of this patent is extended or adjusted under 35 U.S.C. 154(b) by 0 days.

(21) Appl. No.: 12/300,827

(22) PCT Filed: May 21, 2007

(86) PCT No.: PCT/GB2007/001882

§ 371 (c)(1),
(2), (4) Date: Aug. 26, 2009

(87) PCT Pub. No.: WO2007/135416

PCT Pub. Date: Nov. 29, 2007

(65) Prior Publication Data

US 2010/0001227 A1    Jan. 7, 2010

(30) Foreign Application Priority Data

May 20, 2006   (GB) ................................ 0610124.0

(51) Int. Cl.
*C09K 5/04* (2006.01)

(52) U.S. Cl. ........................................ 252/67

(58) Field of Classification Search .................. 252/67, 252/68
See application file for complete search history.

(56) References Cited

U.S. PATENT DOCUMENTS

| | | | |
|---|---|---|---|
| 5,672,293 A * | 9/1997 | Minor et al. | .................. 252/67 |
| 6,001,273 A | 12/1999 | Bivens et al. | |
| 2003/0199408 A1 | 10/2003 | Minor et al. | |
| 2004/0014621 A1 | 1/2004 | Minor et al. | |
| 2005/0178998 A1 | 8/2005 | Felix et al. | |

FOREIGN PATENT DOCUMENTS

| | | | |
|---|---|---|---|
| CN | 1560174 A | | 1/2005 |
| GB | 2 298 866 A | | 9/1996 |
| GB | 2438318 A | | 11/2007 |
| GB | 2 438 318 B | | 7/2008 |
| WO | WO 99/24358 | * | 5/1999 |
| WO | WO-2006/038766 A1 | | 4/2006 |

OTHER PUBLICATIONS

English Language abstract for CN1560174 (retrieved from http://ep.espacenet.com on Aug. 11, 2010).

* cited by examiner

Primary Examiner—John R Hardee
(74) Attorney, Agent, or Firm—Modern Times Legal

(57) ABSTRACT

This invention relates to a refrigerant that is azeotropic or near-azeotropic and comprises a binary blend of R1270 and R161, R170 and R717, or R744 and R41. In a first embodiment, the binary blend has a molar composition of 50 to 80 percent R1270, the remainder being R161. In a second embodiment, the binary blend has a molar composition of 30 to 60 percent R717, the remainder being R170. In a third embodiment the binary blend has a molar composition of 20 to 60 percent R744, the remainder being R161.

6 Claims, 3 Drawing Sheets

REFRIGERANT

FIELD OF THE INVENTION

This invention relates to refrigerants, particularly but not exclusively to more environmentally friendly fluids that exhibit a low global warming potential (GWP[1]), and in some instances to fluids that are suitable alternatives for existing refrigerants (such as R410A, R134a, R407C, and R404A) that exhibit a high global warming potential. Such fluids form the working fluid of refrigeration systems, heat pump systems, and other heat transfer systems. The term "refrigerant" used herein is intended, as is usual in the art, to encompass all working fluids that function to transfer heat irrespective of the particular application in which the fluid is used. As a consequence, the term refrigerant should not be narrowly construed to infer that the present invention relates only to fluids used in refrigeration systems (and not, for example, to working fluid for heat pumps).

[1] GWP is defined as the climatic warming potential of a greenhouse gas relative to that of carbon dioxide. The regulatory global warming potential (GWP) is calculated in terms of the 100 year warming potential of one kilogram of a gas relative to one kilogram of CO2. The regulatory GWP figures are those published in the second assessment report adopted by the Intergovernmental Panel on Climate Change (1995 IPCC GWP values). More accurate GWP values are published in the latest IPCC assessment reports.

BACKGROUND TO THE INVENTION

With the international phase-out of chlorofluorocarbons (CFCs) and hydrochlorofluorocarbons (HCFCs) as refrigerants under the requirements of the Montreal Protocol, a variety of refrigerant compositions that do not cause depletion of the ozone layer have been proposed.

However, following the European Community's ratification of the Kyoto Protocol, attention has turned from these CFC and HCFC based refrigerants (whose use has now all but ceased within the EU and other developed countries) to HFCs and other refrigerants that emerged as alternatives to CFCs in the 1990s. Whilst these other refrigerants have no or low ozone depleting potential (ODP), they suffer from the drawback that many of them have a high GWP.

To help the EU to meet its obligations under the terms of the Kyoto treaty, the European Parliament has recently introduced a directive and regulation relating to the use and emission of such fluids.

EC Regulation No 842/2006 introduces a number of controls and restrictions for the use of HFCs in a number of applications. Directive 2006/40/EC goes one step further and prohibits the use, in vehicle air-conditioning systems, of certain fluorinated greenhouse gases with a GWP higher than 150 (evaluated over the standard 100-year time horizon), unless the rate of leakage is no more than 40 to 60 grams of fluorinated greenhouse gases per year.

Whatever the specifics of these items of legislation, it appears likely that new restrictions will be identified for HFCs and other high GWP fluids, and that the use of these fluids will gradually be phased-out for new refrigeration, air conditioning and heat pump applications, and possibly for the refilling of existing systems.

To prepare for such eventualities it would be prudent to investigate practical alternatives to high GWP refrigerants, particularly those alternatives that maintain the advantages associated with some of the existing fluids, namely a low normal boiling point (NBP[2]) in the order of approximately −80° C. to −50° C. In general terms, systems built round refrigerants with an NBP in this range tend to be more compact, and have the potential to be more efficient than systems built round refrigerants with higher NBPs. There are also technical advantages associated with operating above atmospheric pressure, since this greatly reduces the possibility of contaminants such as air and moisture from being drawn into the system, which would result in reduction of refrigerating capacity, degradation of system efficiency and compromise long-term reliability.

[2] The NBP is the boiling point of a fluid at standard atmospheric pressure (101.325 kPa).

Whilst it would clearly be advantageous to use low-GWP refrigerants with NBPs in this range, it is unfortunately the case that the only fluid that is acceptable for use as a refrigerant, which exhibits isothermal or near-isothermal phase-change, has low-GWP (i.e. has a GWP of less than 150) and has an NBP in this range is, at least insofar as we are aware, carbon dioxide (R744). However, it also possesses certain characteristics that make it less desirable as a refrigerant, particularly its high triple point and low critical point.

Mixtures or blends of refrigerants could potentially provide an alternative, but most mixtures which achieve these criteria are zeotropes[3] with an unacceptably high temperature glide, i.e., the change of phase under steady-flow conditions (such as in a direct expansion evaporator or condenser of a refrigerating system) is non-isothermal.

[3] A Zeotrope is defined in International Standard, ISO 817: 2004 "Refrigerants—Designation and Safety Classification" as being: a blend composed of two or more refrigerants whose equilibrium vapour and liquid phase compositions are not the same at any point. An azeotrope is defined in the same international standard as: a blend composed of two or more refrigerants whose equilibrium vapour and liquid phase compositions are the same at a given pressure, but may be different at other conditions.

The use of an azeotropic refrigerant would have specific benefits over zeotropic mixtures, particularly since zeotropes exhibit properties that may ultimately contribute negatively to cycle efficiency of a system using a zeotropic mixture.

For example, with a zeotropic refrigerant fractionation, or partial separation, of refrigerant components may occur, and this may manifest itself as composition variations in circulating refrigerant. This fractionation can also result in disproportionate amounts of refrigerant components being released from the system in the event of a leak, thereby altering the original composition of the circulating refrigerant mixture.

Another negative contributor is the fact that heat exchanger performance in such a system would be reduced, both by temperature glides in the evaporator and condenser and also due to the fact that additional thermodynamic losses manifest as reductions in refrigerant heat transfer coefficient relative to that expected from the individual refrigerant components.

Yet another disadvantage is that system design and selection of system mechanical parts would be significantly more complex, and as a consequence optimisation of such a system would be more difficult and less precise.

It is likely that there would also be significant practical problems associated with a system using a zeotropic refrigerant. For example, interpretation of system performance by service and maintenance technicians would be more complex (such as interpretation of operating pressures and temperatures), and steps may have to be taken to avoid uneven frosting of some evaporators.

In the light of the foregoing, azeotropic or near azeotropic blends (that is to say, zeotropes with less glide than would adversely affect the proper functioning of a system employing that refrigerant, for example a glide of less than 2 K) with a low GWP, low environmental impact, and an NBP in the aforementioned range could prove to be highly desirable, particularly if legislation should emerge to ban the use of high GWP fluids such as HFCs.

However, identifying such blends is not a simple task as there are many fluids that could potentially give rise to an
} azeotropic blend; and there are many thousands of binary, tertiary, and higher order blends of these azeotropes that each could potentially be of interest.

Another significant problem is that it is not simply a matter of selecting individual azeotropes or near azeotropes with a low GWP and favourable thermodynamic characteristics as potential candidates for a blend, as the properties of the blends are often quite different from the properties of the individual components of the blends.

Another problem is that low GWP and favourable thermodynamic characteristics are not the only factors to consider when developing blends. Rather, a multitude of other factors (including: solubility with oils, critical temperature, cost, toxicity, triple point, temperature glide, flammability, ODP) should also be considered when contemplating the use of such fluids in refrigeration and other heat transfer systems. Particular attention should also be paid to the efficiency—or potential coefficient of performance (COP)—of the blend, as these factors are important if a system designed around that blend is to operate efficiently and hence have a reduced impact on the environment.

It is apparent from the foregoing that it would be highly advantageous if refrigerant blends could be devised that had a low GWP, a low environmental impact, an NBP in the aforementioned range, and which exhibit at least a good proportion of the following properties: favourable thermodynamic and transport properties, good solubility with oils, high critical temperature; low cost; low toxicity; low triple point; low temperature glide; low-flammability; low GWP; zero ODP; and high COP. It would also be highly advantageous if blends could be found that not only exhibit a good proportion of these properties, but are also environmentally benign and have good chemical and material compatibility.

SUMMARY OF THE INVENTION

An aim of the present invention is to provide such a refrigerant, and to this end a presently preferred embodiment of the present invention provides a refrigerant that is azeotropic or near-azeotropic and comprises a binary blend of R1270 and R161, R170 and R717, or R744 and R41.

In a first embodiment the binary blend may have a molar composition of 50 to 80 percent R1270, the remainder being R161. In one aspect of this embodiment the binary blend may have a molar composition of 75 percent R1270 and 25 percent R161.

In a second embodiment, the binary blend may have a molar composition of 30 to 60 percent R717, the remainder being R170. In one aspect of this embodiment the binary blend may have a molar composition of 45 percent R170 and 55 percent R717.

In a third embodiment, the binary blend may have a molar composition of 20 to 60 percent R744, the remainder being R41. In one aspect of this embodiment the binary blend may have a molar composition of 50 percent R744 and 50 percent R41.

Preferably the refrigerant has an ozone depletion potential of zero.

Preferably the refrigerant has a global warming potential of less than 150.

Preferably the refrigerant has a safety classification of A3, A2 or A1.

Another aspect of the present invention relates to the use of a refrigerant as described herein in a system that transfers heat by means of a vapour compression cycle.

Yet another aspect of the present invention relates to the use of a refrigerant as described herein as a replacement for HFC, CFC and HCFC based refrigerants.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Figure 1:
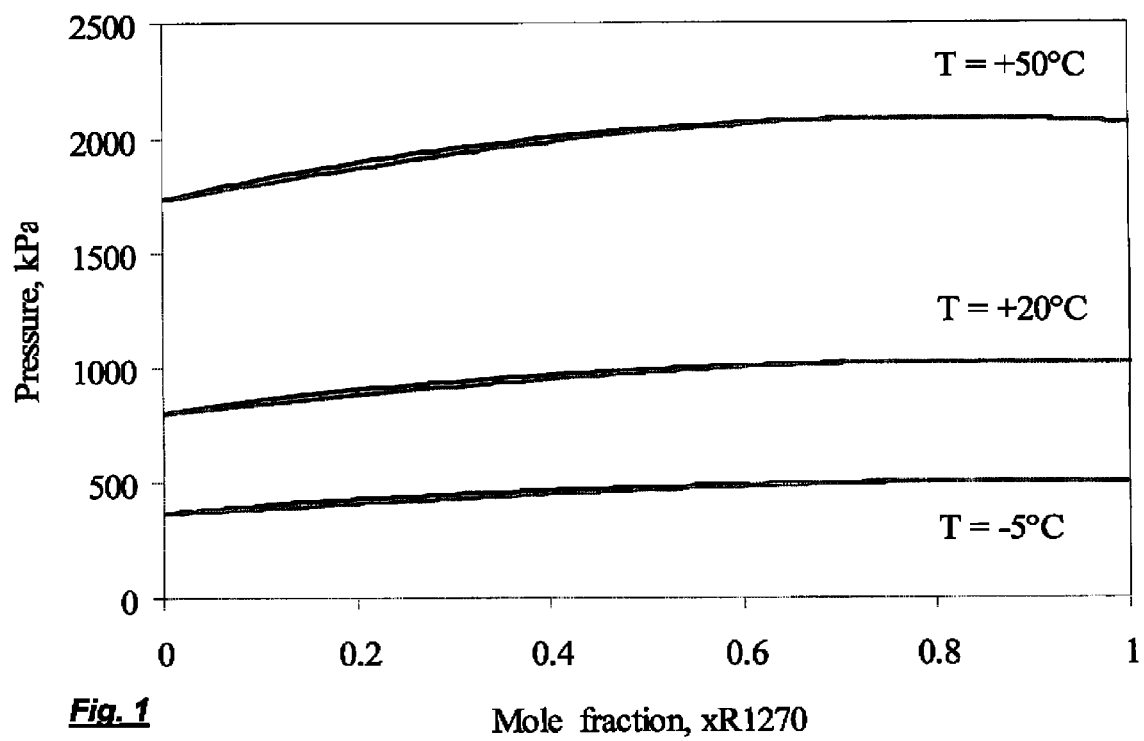
FIG. 1 is a graph depicting the evolution of isotherms for an R161/R1270 mixture at temperatures, T, of +50° C., +20° C. and −5° C.

Before embarking upon a detailed description of the refrigerant blends that we have devised, it is useful at this juncture to briefly explain how these particular blends were devised.

As is well known in the art, there are many thousands of azeotropic or near azeotropic blends which could potentially provide a refrigerant that has suitable properties for use as a replacement for HFC refrigerants. However, azeotropic forecasts from experimental data are extremely expensive and time-consuming to produce, and as such an investigation of each of these in the hope that suitable mixtures will eventually be found would not be a commercially acceptable proposition.

To avoid having to undertake such an intensive investigation, the inventors utilised a novel computerised method for predicting azeotrope formation to reduce costs and narrow the experimental search field. The method used by the inventors (described in the following papers, both of which are incorporated herein by reference: Artemenko S. & Mazur V., "Azeotropy in the natural and synthetic refrigerant mixtures", Int. J. Refrigeration [2007]; and Artemenko S., Khmel'njuk, & Mazur V. "Azeotropy in the natural and synthetic refrigerant mixtures" 6th IIR Gustav Lorentzen Conference on Natural Working Fluids, Glasgow [2004]) is not reliant on vapour-liquid equilibrium calculations, and employs neural networks to develop global-phase diagrams that correlate azeotropic data for binary mixtures based only on critical properties of the individual components in the mixture.

The inventors employed a staged approach for analysing the various physical, chemical, environmental and thermodynamic characteristics of the fluids. The development process followed an iterative procedure in which they firstly prioritised the aforementioned acceptance criteria, and then identified potentially viable fluids. Data was gathered on these potentially viable fluids, and then a subset of these substances was identified, the subset consisting of substances that achieved a particular proportion of the acceptance criteria. Mixtures of these substances were then evaluated having regard to the desired characteristics, and mixtures which met the highest proportion of the acceptance criteria were identified. System performance evaluation was then conducted using system modelling, following which the performance of the selected substances was experimentally evaluated.

From this exercise, the inventors identified the following substances as being of particular interest: R-1270 (propene), R-161 (ethyl fluoride), R-170 (ethane), R-41 (methyl fluoride), R-717 (ammonia) and R-744 (carbon dioxide).

The basic characteristic data for these fluids is listed in Table 1 below.

The thermophysical properties of the various mixtures were then evaluated with respect to critical point, saturation pressure-temperature, triple point, temperature glide, and other properties such as densities, enthalpies and viscosities.

TABLE 1

Characteristics of selected refrigerants

| Refrigerant | R-1270 | R-161 | R-170 | R-41 | R-717 | R-744 |
|---|---|---|---|---|---|---|
| Chemical name | propene | ethyl fluoride | ethane | methyl fluoride | ammonia | carbon dioxide |
| Chemical formula | $CH_3CH=CH_2$ | $CH_3CH_2F$ | $CH_3CH_3$ | $CH_3F$ | $NH_3$ | $CO_2$ |
| Molar Mass (kg/kmol) | 42.08 | 48.06 | 30.1 | 34.03 | 17.03 | 44.01 |
| NBP (° C.) | −47.7 | −37.6 | −88.6 | −78.3 | −33.3 | −78.4 |
| Critical temp (° C.) | 92.4 | 102.1 | 32.2 | 44.1 | 132.3 | 31.1 |
| LFL[4] (% vol) | 2 | 3.8 | 3.2 | 7.1 | 14.8 | none |
| ISO 817 safety class | A3 | A2 | A3 | A2 | B2 | A1 |
| ODP | 0 | 0 | 0 | 0 | 0 | 0 |
| GWP (100) | <150, e.g. ~3 | <150, e.g. ~12 | <150, e.g. ~3 | <150, e.g. ~97 | <150, e.g. <1 | 1 |

[4]Lower Flammability Limit

Following the selection of these substances, the inventors then identified suitable mixtures and evaluated their thermophysical, chemical and environmental aspects. Identification of mixtures was accomplished using mathematical modelling, and the findings of the model were verified by experiment.

The modelling developed the concept of local mapping based upon cubic type models for the equation of state (EOS) to define exact EOS parameters for pure substances. Local mapping enables the attainment of a reliable thermodynamic consistency between experimental data on saturation curves and model EOS from equalities of pressures, isothermal compressibilities and internal energies. Parameters for the thermodynamic models for mixtures of interest were obtained from experimental phase equilibria data, and the artificial neural network restores the values of long range attraction between molecules of the component fluids. The interaction parameters generated from the artificial neural network or experimental data were used together with critical constants of pure components to define dimensionless azeotropy criteria, which characterise differences between critical parameters and express the conditions of azeotropy appearance for given binary mixtures.

Azeotropy boundaries for different modifications of cubic EOS as a result of solving the system of thermodynamic equations for tangent critical azeotrope involve all azeotropic phenomena such as critical azeotropic end-point, critical azeotropic point, critical azeotropic cusp, double azeotropic end-point, double critical/azeotropic end-point, etc. The set of parameters for the given EOS univocally define a global phase diagram and, accordingly, evolution of phase behaviour for binary mixtures in wide range of temperatures and pressures which include all possible phenomena (zeotropic and azeotropic states, liquid—vapour and liquid—liquid—vapour equilibria, etc.). Some refrigerant mixtures can exhibit all varieties of the phase equilibria phenomena, including transitions from zeotropic to azeotropic state and vice versa with change of state parameters. This opportunity follows from the type of phase behaviour which is defined by the EOS parameters. This thermodynamic modelling allows forecasting of azeotropic behaviour for systems R170/R717 and R1270/R161 and near azeotropic behaviour for R744/R41. Two types of concurrent cubic EOS (Soave-Redlich-Kwong and Peng-Robinson) were considered and the EOS selection was carried out on the basis of data treatment comparison.

It was then determined whether chemical interactions are likely to take place between the component fluids, with compressor oils, common contaminants such as air and moisture, and with common system construction materials including metals, plastics, elastomers and compressor oils. At this stage, other factors such as the mixing characteristics of the substances identified, and their flammability and toxicity were also considered.

Next, consideration was given as to the likely safety classification of such mixtures. This was accomplished by calculating, from currently available safety information (toxicity, flammability), the resultant ISO 817 classification, for both the intended mixture and fractions thereof. Whilst it is important to strive for improved potential efficiency, there are also significant advantages associated with a "lower" (i.e. less hazardous) safety classification.

Finally, the environmental characteristics of the proposed blends were considered. Of primary interest in this regard, is the evaluation of mixture GWP and ODP, but consideration was also given to other environmental factors (such as the potential for photochemical ozone creation, and bio-accumulation) in the hope that future legislation to control such factors will not affect the chosen blends.

Once preferred mixtures were determined, consideration was then given to their performance within the intended refrigeration systems. This was initially carried out by system performance simulations, and latterly by experimental evaluation. In addition to checking that minimum performance criteria are met, the simulated and experimental exercises are additionally used to determine the mixture composition that provides an improved efficiency across the range of likely equipment. Consideration was also given as to the performance of possible blends in existing components and systems that have been designed for already commercialised refrigerants, since the application of new refrigerants is simplified if components are already available Following completion of the aforementioned investigation, the inventors identified the following refrigerant blends as being of interest: R1270/R161, R170/R717 and R744/R41. Each of these blends has distinct characteristics and each is therefore suited to certain types of application. They also possess significant advantages, detailed below, over currently used refrigerants for these applications.

R1270/R161 Blend

This blend is a mixture of R1270 and R161, and is considered to be broadly applicable to systems used for domestic and commercial air conditioning, and heat pumping. FIG. 1 illustrates the relationship between saturation pressure and composition of the R1270/R161 mixture. Each set of curves (two lines of each) are isotherms (lines of constant temperature, T) as indicated for −5° C., +20° C. and +50° C. This temperature range represents the approximate limits of the anticipated operating conditions for air-conditioning equipment.

For each set of curves, the upper line indicates the pressure of the saturated liquid (also known as the bubble-point) at the temperature, T, and the lower line indicates the pressure of the saturated vapour (also known as the dew-point).

For most mixtures, the bubble- and dew-point lines are separate for the entire range of compositions, and only converge when the composition reaches 100% or 0% of one or the other components. For this particular blend, the azeotropic region is where the two lines converge at compositions other than 100% and 0%. At these compositions, the blend behaves as if it were a pure, single component fluid.

As shown in FIG. 1 this first blend was found to exhibit azeotropy around molar compositions of 20% to 50% of R161 (FIG. 1) at temperatures that correspond to typical operating conditions. Across this range, the saturated pressure-temperature characteristics and volumetric refrigerating capacity are close to that of R410A. Additionally, the critical temperature is somewhat higher (by almost 25 K), indicating improved performance, particularly at higher ambient temperatures. Given these aspects, the blend is considered to be broadly applicable to systems used for domestic and commercial air conditioning, and heat pumping.

A performance evaluation of this blend was carried out in order to determine the preferred composition (from an operational perspective), and to compare its efficiency and capacity against the closest available refrigerant.

The preferred mixture will have as high a refrigerating capacity as possible, and as close to an azeotropic composition as possible. Initial theoretical analysis indicated that a blend range of 20% R161/80% R1270 to 50% R161/50% R1270 would be appropriate, although a negligible temperature glide was observed consistently over this range of compositions. Further investigations using system performance evaluations with a detailed system model implementing European rating conditions revealed the following, when compared to R410A:

the evaporating capacity is a little greater than the theoretical results, being about 85% of R410A, and the condensing capacity being a little less;

the cooling Coefficient of Performance (COP) is over 10% higher than R410A, whilst heating COP is at least 6% higher;

a significant reduction of about 25% compressor power; and the evaporating temperature for all compositions was similar to R410A, whereas the blend condensing temperature is about 1 K lower and the discharge temperature is around 3-4 K lower than R410A.

In general, for the compositions evaluated there was little difference amongst most of the performance measures. There would appear to be a marginal benefit for capacity and COP when a 50%/50% blend is used, otherwise the smallest glide, or azeotropic concentration, is around 40% R161, suggesting at least initially that this may be the preferred concentration.

As regards toxicity, the toxicity class of both fluids according to ISO 817 is "A" (low toxicity), and as a consequence any blend of R1270 and R161 is also likely to achieve an "A" classification. In terms of flammability, R1270 has a "3" classification (high flammability), whereas the available lower flammability limit (LFL) data for R161 places it in classification "2" (low flammability). This would suggest that in order for the mixture to achieve the more desirable "A2" classification, the molar composition of R1270 should be in the region of 20%-50%, depending upon the LFL.

However, as previously indicated the choice of composition is dependent on many factors and in this particular case the inventors have concluded that a slight reduction in safety is more than compensated for by more favourable thermodynamic properties, and have determined that a blend with a higher proportion of R1270 would be most appropriate.

Thus, whilst blends of 20 to 50% R161 with 80 to 50% R1270 are acceptable, the preferred blend is of 75% R1270/ 25% R161. Whilst this blend is likely to achieve an A3 safety classification (which classification is entirely acceptable, but not quite as good as that which could potentially be achieved) the benefits (namely better efficiency, smaller temperature glide and more environmentally benign) associated with the environmentally benign component (R1270) are increased as compared with a blend that achieved an "A2" safety classification.

R170/R717 Blend

This blend has particular utility as a refrigerant for process freezing and industrial blast freezers.

Figure 2:
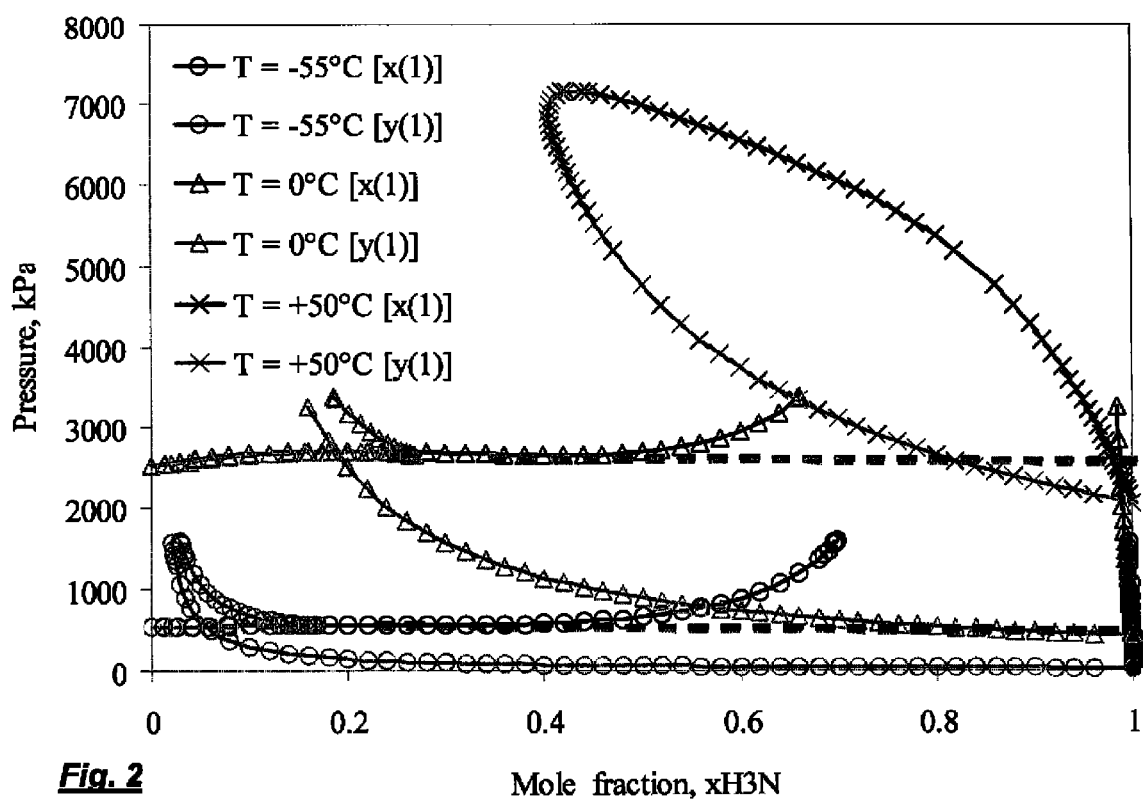
FIG. 2 is a graph depicting the evolution of isotherms for an R170/R717 mixture at temperatures, T, of +55° C., 0° C. and −55° C.

FIG. 2 illustrates the relationship between saturation pressure and composition of the R170/R717 mixture. Each set of curves (two lines of each) are isotherms (lines of constant temperature) as indicated for T=−55° C., T=0° C. and T=+50° C. This temperature range represents the approximate limits of the anticipated operating conditions for blast freezing equipment.

As before, for each set of curves, the upper line indicates the pressure of the saturated liquid (also known as the bubble-point) at the temperature, T, and the lower line indicates the pressure of the saturated vapour (also known as the dew-point).

The dashed lines correspond to the three-phase (liquid-liquid-vapour) equilibrium. The continuation of dew and bubble point's curves above three-phase lines (isotherms −55° C. and 0° C.) reproduces the metastable states, that is, where the equilibrium conditions of the mixture may be sustained even if the external conditions—such as pressure or temperature—are changed.

As aforementioned, the bubble- and dew-point lines for most blends are separate for the entire range of compositions, and only converge when the composition reaches 100% or 0% of one or the other components. However, for this blend the azeotropic region is where the two lines converge at compositions other than 100% and 0%. A positive azeotrope has a maximum in the curve of pressure as a function of composition at given temperature (isotherms −55° C. and 0° C.). At these compositions, the mixture behaves as if it were a pure, single component fluid. As temperature increases, the azeotropic vapour composition moves from the zone of the liquid—liquid miscibility gap in the direction of higher mole fractions of ammonia. At the high temperature limit, the homogeneous positive azeotropy disappears. The three-phase line terminates in the liquid-liquid upper critical end point (UCEP), which lies approximately 10 K above the critical temperature for pure ethane (about +44.9° C.). At low temperatures the liquid-liquid-vapour three-phase range the liquid phase is richer in ammonia. The R170-R717 blend also forms heterogeneous positive azeotropes (where the two components are not homogeneously mixed) up to the liquid-liquid UCEP where the occurrence of three fluid phases is observed as a liquid, vapour, and liquid sequence (which is contrary to conventional three-phase equilibria with liquidliquid-vapour sequence). The +50° C. isotherm is shown to terminate at intermediate compositions; these points represent the critical state, thus indicating the maxima for operation of a particular mixture.

This blend is a mixture of R170 and R717, which under typical operating conditions was found to exhibit azeotropy around molar compositions of 40% to 70% R170 (FIG. 2).

This blend possesses some advantages over the refrigerants normally used in industrial type applications. In the case of pure ammonia, which has a relatively high NBP (i.e. higher than the desired application temperature), low evaporating temperatures lead to sub-atmospheric operation which can cause air to leak into the system, and very high compressor discharge temperatures, often necessitating an additional stage of compression with inter-stage cooling. A mixture of R170 and R717 addresses these drawbacks by significantly reducing the NBP and also allowing much lower discharge temperatures. A principle consequence of this is that single-stage compression may be used instead of two-stage, and hence the necessity for an additional compressor can be avoided.

As compared with R744, this blend addresses the problem of high triple point, in that if the system is operating at low evaporating temperature (below approximately minus 55° C.), solidification of the refrigerant will not occur. Lastly, the introduction of R170 addresses the problem that refrigeration oils generally have poor miscibility with R717.

In light of the foregoing, this blend is considered to be broadly applicable to systems used for industrial food processing and blast freezing applications.

Once the blend had been identified as being of interest a performance evaluation was carried out in order to determine the preferred composition (from an operational perspective), and to compare its efficiency and capacity against the closest available refrigerant. In this particular case, evaluation of the performance of this R717 and R170 blend is difficult because the blend exhibits very complex phase behaviour, having two critical curves, two three-phase equilibria, and two azeotropic lines.

The limited property data available for this mixture was used to analyse the performance with a property-based cycle model, which provides a quantitative indication of the performance relative to other refrigerants. The following general findings were made:

the COP is similar over the range of azeotropic compositions, albeit slightly lower than that of pure R717;
the volumetric refrigerating effect (VRE) exhibits a synergetic behaviour and gives considerably higher VRE values than pure components, necessitating a smaller compressor displacement than would be required for either of the single components for a given refrigerating capacity;
the temperature of the refrigerant discharged from the compressor is significantly lower than R717, which favours system reliability;
an improved heat transfer, particularly in the evaporator, was observed, resulting in higher evaporating temperatures, which equates to an incremental improvement in cycle efficiency; and
The rate of degradation in system efficiency and refrigerating capacity as the heat rejection (or heat sink) temperature rises for the mixture is less than the rate of degradation of the pure components.
Given the similar operating characteristics of the blend across the azeotropic composition band initial observations are that, from a thermodynamic efficiency view point, no particularly preferred specific mixture exists within the aforementioned 40% to 70% R170 range.

Considering the question of toxicity, ISO 817 indicates that the toxicity class of R170 is "A", whilst that of R717 is "B" and as a consequence (depending upon the composition of the mixture) it is likely that the blend will have either an "A" or "B" classification.

Using the available toxicity data for these fluids within ISO 817, the inventors have determined that an "A" classification may be achieved by ensuring a molar composition of least 21% of R170.

Considering now the question of flammability, R170 has a "3" classification, whereas R717 has a classification of "2". Again, using the appropriate flammability data and Le Chatelier's rule, suggests that a flammability classification of "2" may be achieved with a molar composition of at least 27% of R717. This would suggest, if achievement of the more desirable "A2" classification is the key factor, that the molar composition should be between 21% and 73% of R170.

However, as previously indicated the choice of composition is dependent on many factors and in this particular case the inventors have concluded the most desirable performance and safety classification coincide with similar compositions. Thus, whilst blends of 30 to 60% R717 and 70 to 40% R170 are acceptable, the preferred blend is 45% R170 and 55% R717 as this blend would be given an "A2" safety classification whilst also achieving a sufficiently high critical temperature to enable efficient operation under maximum anticipated ambient temperatures.

R744/R41 Blend

This blend has particular utility as a blend for commercial point-of-sale refrigeration equipment.

Figure 3:
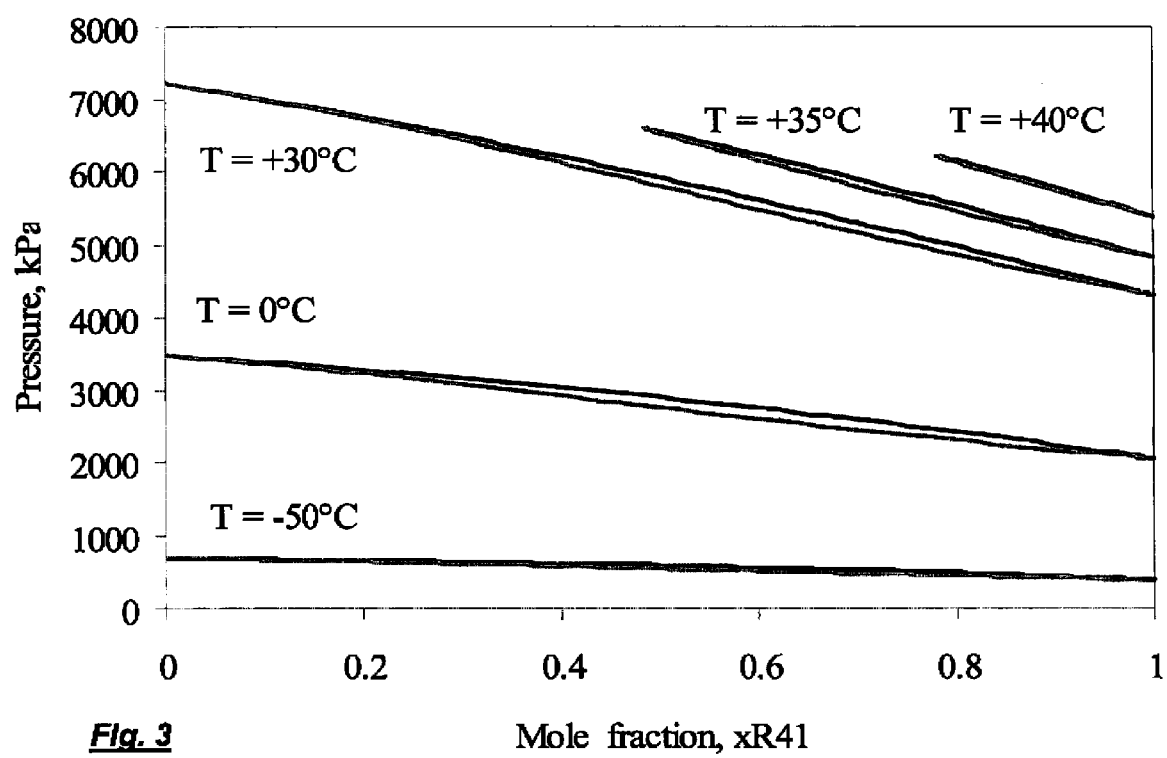
FIG. 3: is a graph depicting the evolution of isotherms for an R744/R41 mixture at temperatures, T, of −50° C., +30° C., +35° C. and +40° C.

FIG. 3 shows the relationship between saturation pressure and composition of the mixture. Each set of curves (two lines of each) are isotherms (lines of constant temperature, T) as indicated for −50° C., 0° C., +30° C., +35° C. and +40° C. This temperature range represents the approximate limits of the anticipated operating conditions for refrigeration and freezing equipment.

As before, for each set of curves, the upper line indicates the pressure of the saturated liquid (also known as the bubble-point) at the temperature, T, and the lower line indicates the pressure of the saturated vapour (also known as the dew-point).

The T=+35° C. and T=+40° C. isotherms are shown to terminate at intermediate compositions; these points represent the critical points, thus indicating the maxima for operation of a particular mixture.

For most mixtures, the bubble- and dew-point lines are separate for the entire range of compositions, and only converge when the composition reaches 100% or 0% of one or the other components. However for this particular blend, the two lines do not fully converge at intermediate compositions, but the envelope is narrower than would be expected for an ideal mixture according to Raoult's law, thus representing a near-azeotropic blend. At these compositions, the mixture behaves more like a single component fluid than would otherwise be expected.

This blend is a mixture of R744 and R41, which under typical operating conditions was found to exhibit near azeotropy over the entire range of compositions (FIG. 3). The addition of R41 to R744 has additional advantages in terms of property changes, specifically, raising the critical temperature and lowering the triple point. For pure R744 the relatively low critical temperature and relatively high triple point hinder its application, and cause super-critical operation at high ambient temperatures and possible solidification when the refrigerant undergoes rapid reduction of pressure towards atmospheric. As will be apparent from the foregoing, the characteristics of this blend could help alleviate these problems.

Once the blend had been identified as being of interest a performance evaluation was carried out in order to determine the preferred composition (from an operational perspective), and to compare its efficiency and capacity against the closest available refrigerant. However, the choice of composition should also be based according to availability of components that can handle the relatively high pressures required for this blend. Further considerations include maintaining as high a critical temperature as possible, reducing temperature glide and as in other cases, achieving a high COP. System performance evaluations with a detailed system model were carried out using European rating conditions, and these studies revealed that:

In all cases, the refrigerating capacity and pressure of the blend was significantly greater than that of R410A;

both the evaporating and condensing capacity increase notably as R744 composition increases;

there is a notable reduction in both heating and cooling COP as R744 composition increases; and that evaporating and condensing temperatures show little variation across the range of compositions, whereas the discharge temperature rises slightly with higher R744 composition.

For the compositions evaluated, there is a trade-off between refrigerating capacity and efficiency, since there is an almost linear reduction in COP and increase in capacity with increasing R744 composition. The greatest glide occurs at around 40% R744 although it is relatively small (around 1.5 K) over the expected operating pressure range. Similarly, the critical temperature reduces linearly as the molar composition of R744 is increased. These characteristics suggest that the chosen composition favours a higher proportion of R41, from the point of view of performance.

Considering the question of toxicity, it is noted that the toxicity class of both fluids according to ISO 817 is "A", thus any composition of R744 and R41 is also likely to achieve an "A" classification.

In terms of flammability, R744 is non-flammable, thus it has a "1" classification, whereas the mild flammability of R41 places it in classification "2". Thus, increasing the composition of R744 gradually reduces the flammability of the mixture until a flame cannot be sustained. Using the lowest value of LFL found for R41 in published literature, we estimated—using the minimum oxygen content approach—the composition that would be necessary to ensure a flammability classification of "1", and found that a molar composition of around 50% to 70% R744 would be desirable. From this we determined that to achieve the more desirable "A1" classification, the molar composition of R744 in the blend should be at least 50%.

However, as previously indicated the choice of composition is dependent on many factors and in this particular case the inventors have concluded the most desirable performance and safety classification coincide with similar compositions. Thus, whilst blends of 20% to 60% R744 and 80% to 40% R41 would be acceptable, a particularly preferred composition that achieves a sufficiently high critical temperature and also attains an "A1" safety classification has a composition of 50% R744 and 50% R41.

It will be apparent, from the foregoing, that by using a combination of property modelling, safety analyses and comprehensive system simulation, a number of azeotropic and near-azeotropic blends have been identified for use in certain applications where existing refrigerant options are subject to a variety of hindrances. A summary of the characteristics of these new blends is provided in Table 2.

TABLE 2

Characteristics of new blends

| Name | Blend 1 | Blend 2 | Blend 3 |
|---|---|---|---|
| Composition Range | 50 to 80% R1270, the remainder being R161 | 30 to 60% R717, the remainder being R170 | 20 to 60% R744, the remainder being R41 |
| Preferred Composition (molar) | 75% R1270, 25% R161 | 45% R170, 55% R717 | 50% R744, 50% R41 |
| Molar Mass | 43.6 | 22.9 | 39.0 |
| NBP (° C.) | −49.2 | −109.6 C. | −84.5 |
| Critical temp (° C.) | 94.9 | 41.9 C. | 37.9 |
| LFL (% vol) | 2.7-2.9 | 4.0-4.2 | None |
| Likely safety class | A3 | A2 | A1 |
| ODP | 0 | 0 | 0 |
| GWP (100) | <150, e.g. ~5 | <150, e.g. ~1 | <150, e.g. ~50 |

These new blends offer notable advantages over existing refrigerants. In particular these blends exhibit:

zero ODP;

a low (below 150) GWP;

improved thermodynamic properties (such as critical temperature and temperature glide) over similar existing refrigerants;

good solubility with oils;

low toxicity; and reduced flammability.

In addition, these blends comprise predominately environmentally benign substances and as such are more environmentally friendly than some existing refrigerants, and have well known and understood chemical and material compatibility.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims. In particular it should be noted minor deviations (for example of the order of up to ±5%) from the compositions mentioned herein that do not materially affect the functionality of the refrigerant are considered to be within the scope of the invention claimed.

It should also be noted that whilst the accompanying claims set out particular combinations of features described herein, the scope of the present invention is not limited to the particular combinations hereafter claimed, but instead extends to encompass any combination of features herein disclosed.

The invention claimed is:

1. A refrigerant that is azeotropic or near-azeotropic and comprises a binary blend of R1270 and R161; wherein said binary blend has a molar composition of 50 to 80 percent R1270 and a remainder of said refrigerant is R161.

2. A refrigerant according to claim 1, wherein the binary blend has a molar composition of 75 percent R1270 and 25 percent R161.

3. A refrigerant according to claim 1, wherein the refrigerant has an ozone depletion potential of zero.

4. A refrigerant according to claim 1, wherein the refrigerant has a global warming potential of less than 150.

5. A refrigerant according to claim 1, wherein the refrigerant has a safety classification of A3, A2 or A1.

6. A method of recharging a heat transfer system that includes an existing refrigerant, the method comprising:
    unsealing the heat transfer system to gain access to the existing refrigerant;
    removing substantially all of the existing refrigerant from the heat transfer system;
    filling the heat transfer system with a refrigerant that is azeotropic or near-azeotropic and comprises a binary blend of R1270 and R161; wherein said binary blend has a molar composition of 50 to 80 percent R1270 and a remainder of said refrigerant is R161; and
    resealing the heat transfer system.

* * * * *